(12) United States Patent
Shimamura et al.

(10) Patent No.: US 6,571,056 B2
(45) Date of Patent: May 27, 2003

(54) WATERPROOF CASE FOR CAMERA

(75) Inventors: Takashi Shimamura, Itabashi-ku (JP); Keiji Enomoto, Oume (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/041,562

(22) Filed: Jan. 10, 2002

(65) Prior Publication Data

US 2002/0090212 A1 Jul. 11, 2002

(30) Foreign Application Priority Data

Jan. 10, 2001 (JP) .......................................... 2001-002982

(51) Int. Cl.⁷ .......................... G03B 17/08; H04N 5/222
(52) U.S. Cl. ....................... 396/27; 396/29; 348/333.06; 348/333.09
(58) Field of Search ............................. 396/27, 25, 29, 396/28, 26; 348/333.01, 333.06–333.09, 81, 373; 358/906, 909.1

(56) References Cited

U.S. PATENT DOCUMENTS

| | | | | |
|---|---|---|---|---|
| 4,041,507 A | * | 8/1977 | Ko et al. ...................... | 396/28 |
| 4,714,333 A | * | 12/1987 | Tamamura et al. ............ | 396/29 |
| 4,724,448 A | * | 2/1988 | Maeda et al. .................. | 396/29 |
| 5,610,655 A | * | 3/1997 | Wakabayashi et al. ....... | 348/373 |
| 5,822,622 A | * | 10/1998 | Inoue ........................... | 396/27 |
| 6,128,441 A | * | 10/2000 | Kamata et al. ................ | 396/25 |
| 6,138,826 A | * | 10/2000 | Kanamori et al. ....... | 206/316.2 |

FOREIGN PATENT DOCUMENTS

JP 2811234 8/1998

* cited by examiner

Primary Examiner—David M. Gray
Assistant Examiner—Rochelle Blackman
(74) Attorney, Agent, or Firm—Oblon, Spivak, McClelland, Maier & Neustadt, P.C.

(57) ABSTRACT

A waterproof case for containing a camera includes a case body configured such that the camera is freely inserted therein and removed therefrom, and an optical system arranged at a part of the case body where a photographic lens of the camera faces. The optical system serves as a conversion lens for the photographic lens.

32 Claims, 8 Drawing Sheets

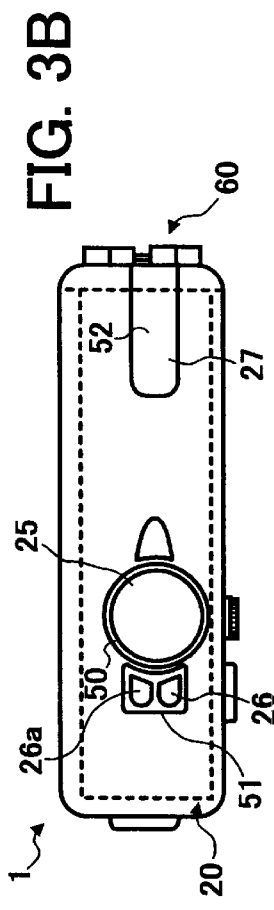
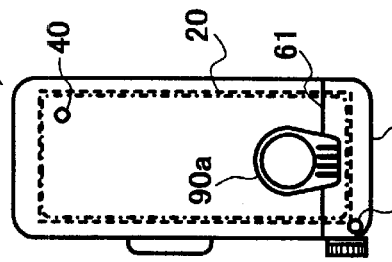
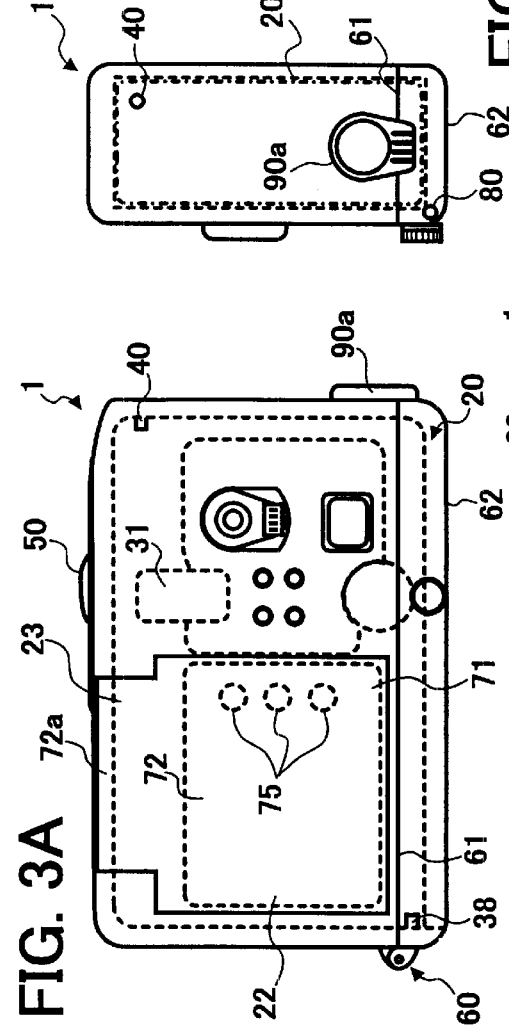
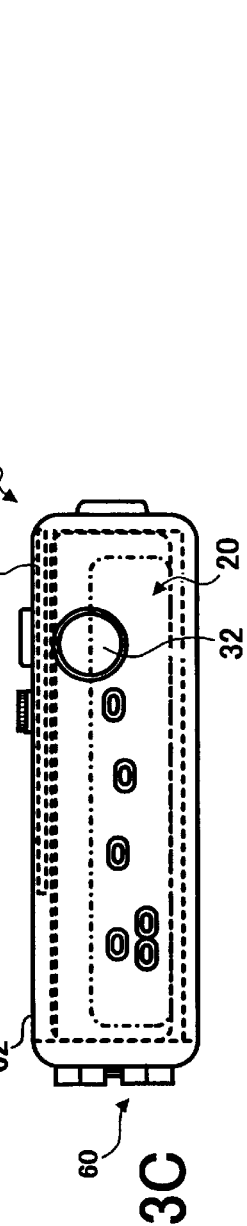
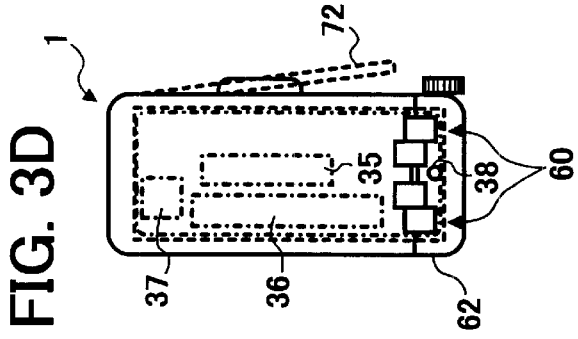

WATERPROOF CASE FOR CAMERA

CROSS REFERENCE TO RELATED APPLICATIONS

This document claims priority and contains subject matter related to Japanese Patent Application No. 2001-002982 filed in the Japanese Patent Office on Jan. 10, 2001, and the entire contents of each of which are hereby incorporated herein by reference.

BACKGROUND OF THE INVENTION

1. Field of the Invention

The present invention relates to a waterproof case for containing a camera, such as a silver halide camera, a digital camera, a video camera, etc., in a watertight manner.

2. Discussion of the Background

Generally, a waterproof case for a camera is formed from a rectangular transparent plastic case shaped like a camera in consideration of robustness, waterproofness, etc. in which openings respectively provided at front and rear sides of a case body of the waterproof case are constructed to open and close by front and rear covers. Such a waterproof case includes packing and O-rings so that the waterproof case is watertight.

Japanese patent No. 2811234 describes a waterproof case for a camera in a substantially rectangular shape. The waterproof case is divided into two parts. The respective parts of the waterproof case are pivotally supported.

A flat binocular type camera had in the past been employed in a silver halide camera such as a 110 mm film size camera, a bridge camera, and the like. Such a binocular type camera has not been typically manufactured and not been on the market for a while.

Recently, many digital cameras, however, have increasingly used such flat binocular type camera designs because of advantages in layouts of an optical system, an electric circuit board, components, etc.

Operation buttons of the camera, which is contained in the waterproof case, are operated from outside of the waterproof case by use of shafts passing through the waterproof case. The operation buttons of the camera are pressed by pushing the shafts. In order to maintain the watertightness of the waterproof case, O-rings and packing provided for the respective shafts. In addition, coil springs are also provided for returning the shafts to their original positions. Thereby, the construction of the background waterproof case for a camera is typically complicated.

The present inventors realized that when a camera is contained in a waterproof case, not all functions of the camera may be used.

A waterproof case for a camera that allows the camera contained in the waterproof case to be operated from outside of the waterproof case in a simple construction has been sought. Further, a waterproof case for a camera that can expand functions of the camera has been desired.

SUMMARY OF THE INVENTION

According to one aspect of the present invention, a waterproof case system for containing a camera includes a case body configured such that the camera is freely inserted therein and removed therefrom, and a first optical system arranged at a first part of the case body where a photographic lens of the camera faces, said first optical system including a conversion lens configured to cooperate with the photographic lens.

According to another aspect of the present invention, a waterproof case device for containing a flat binocular type camera includes a case body configured such that the camera is freely inserted therein and removed therefrom, the case body having a rear opening at a rear part of the case body configured to insert the camera into the case body, a rear cover configured to be pivotally supported by a first shaft so as to open and close the rear opening of the case body, and a lock mechanism configured to lock the closed rear cover so that the waterproof case is watertight.

According to another aspect of the present invention, a waterproof case device for containing a camera having a liquid crystal display (LCD) panel serving as an operation unit for inputting operational conditions of the camera, the waterproof case includes a case body configured such that the camera is freely inserted therein and removed therefrom, and a sheet-like transparent member arranged at a part of the case body corresponding to the LCD panel of the camera contained in the case body such that inputting operational conditions of the camera to the LCD panel is performable from outside of the case body through the sheet-like transparent member.

According to another aspect of the present invention, a waterproof case for containing a camera having a liquid crystal display (LCD) panel serving as an operation unit for inputting operational conditions of the camera, the waterproof case includes a case body configured such that the camera is freely inserted therein and removed therefrom, the case body forming an opening at a part corresponding to the LCD panel of the camera contained in the case body, and a rotatable upper cover configured to open and close the opening of the case body.

Objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3A is a top view of the waterproof case of FIG. 1A containing the digital camera of FIG. 2A, FIG. 3B is a front view of the waterproof case of FIG. 3A, FIG. 3C is a rear view of the waterproof case of FIG. 3A, FIG. 3D is a left side view of the waterproof case of FIG. 3A, and FIG. 3E is a right side view of the waterproof case of FIG. 3A;

DESCRIPTION OF THE PREFERRED EMBODIMENTS

Figure 1A:
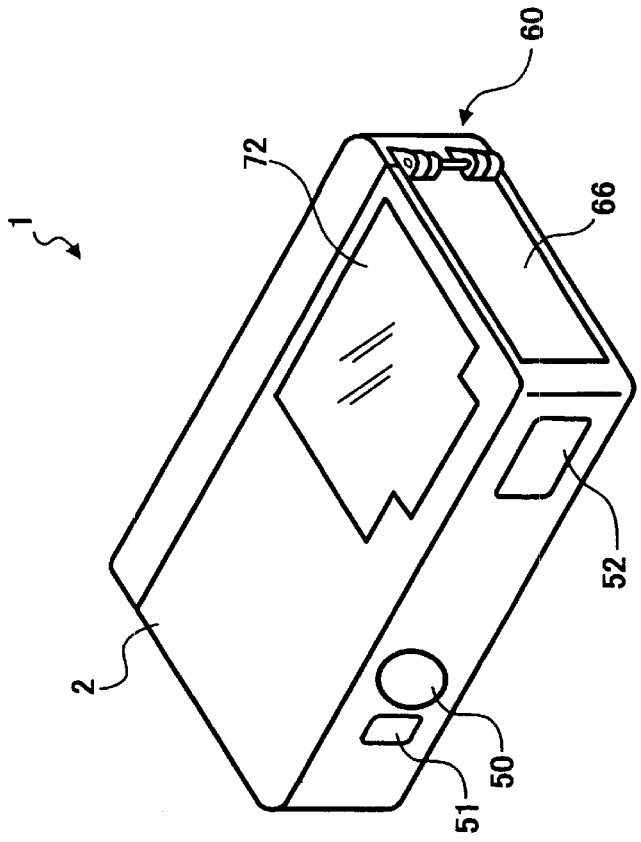
FIG. 1A is a schematic perspective view of a waterproof case for a digital camera according to an embodiment of the present invention, which is taken from the back.

Preferred embodiments of the present invention are described in detail referring to the drawings, wherein like reference numerals designate identical or corresponding parts throughout the several views.

Figure 1B:
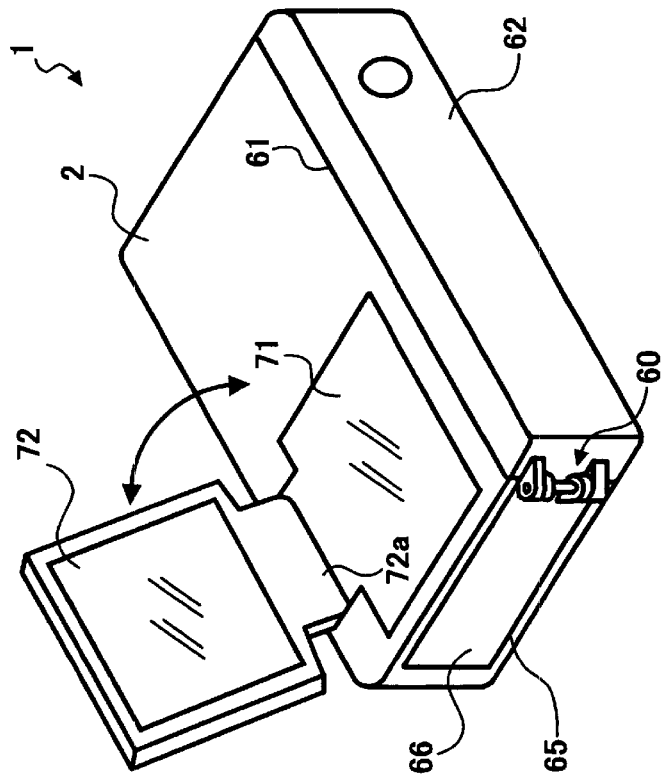
FIG. 1B is a schematic perspective view of the waterproof case of FIG. 1A, which is taken from the front.

FIG. 1A is a schematic perspective view of a waterproof case for a digital camera according to an embodiment of the present invention, which is taken from the back. FIG. 1B is a schematic perspective view of the waterproof case of FIG. 1A, which is taken from the front.

Figure 2A:
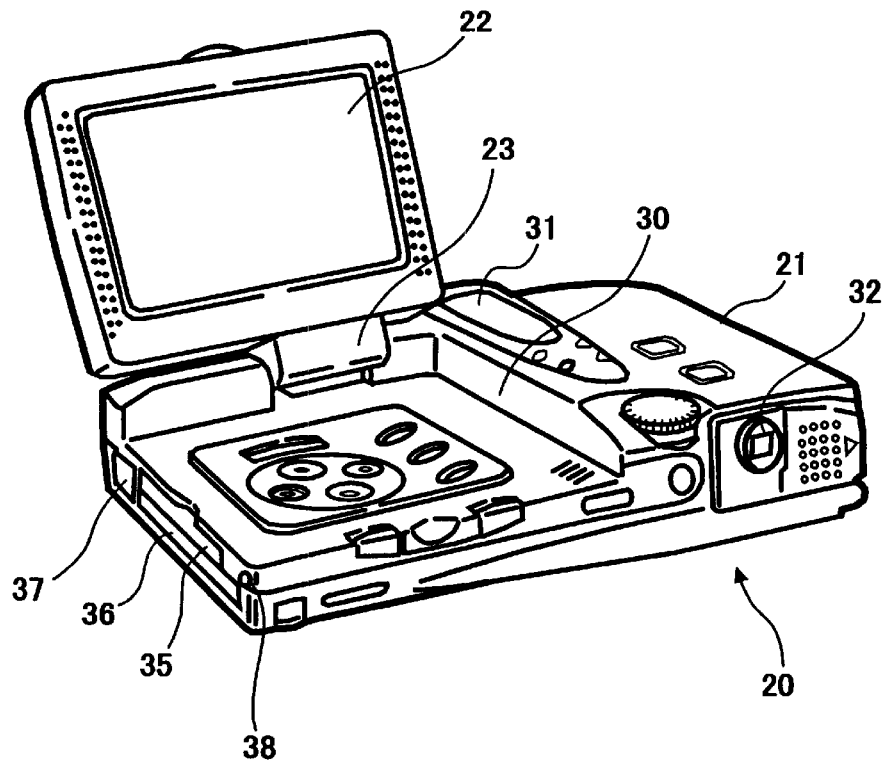
FIG. 2A is a schematic perspective view of a digital camera according to the embodiment of the present invention, which is taken from the back.
Figure 2B:
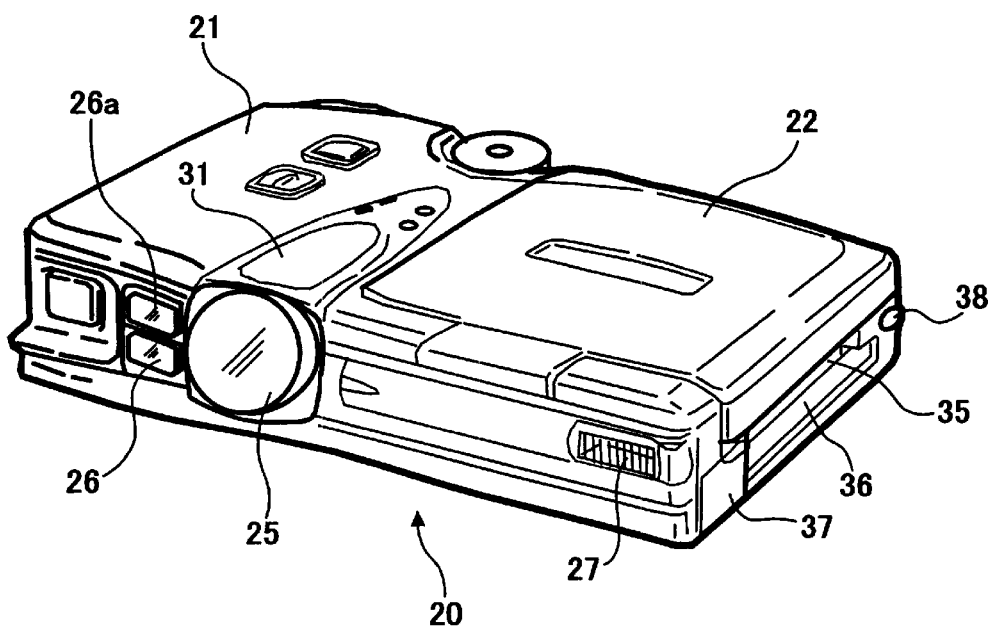
FIG. 2B is a schematic perspective view of the digital camera of FIG. 2A, which is taken from the front.

FIG. 2A is a schematic perspective view of a digital camera according to the embodiment of the present invention, which is taken from the back. FIG. 2B is a schematic perspective view of the digital camera of FIG. 2A, which is taken from the front.

FIG. 3A is a top view of the waterproof case of FIG. 1A containing the digital camera of FIG. 2A. FIG. 3B is a front view of the waterproof case of FIG. 3A. FIG. 3C is a rear view of the waterproof case of FIG. 3A. FIG. 3D is a left side view of the waterproof case of FIG. 3A. FIG. 3E is a right side view of the waterproof case of FIG. 3A.

A waterproof case 1 for a digital camera 20 includes a case body 2 at least a part of which is made of transparent resin material such as plastic. According to one embodiment of the present invention, a variety of functions of the digital camera 20 contained in the waterproof case 1 may be performed through the waterproof case 1 by providing various members and functions with the case body 2.

As illustrated in FIGS. 2A and 2B, the digital camera 20 includes a camera body 21 in a flat binocular shape. Referring to FIG. 2B, the digital camera 20 includes a photographic lens 25, a viewfinder objective lens 26, an Auto Focus (AF) viewfinder window 26a, and a flash light emission window 27 at a front surface of the camera body 21.

As illustrated in FIG. 2A, the camera body 21 includes a portion 30 at an upper left side of the camera body 21 in FIG. 2A. At one side wall of the portion 30, a biaxial pivotal part 23 is provided to pivotally support the LCD panel 22.

The LCD panel 22 is used to display photographed images and may be used as an electronic viewfinder in a photographing mode. The LCD panel 22 also serves as an operation unit for inputting operational conditions of the digital camera 20. An operator inputs operational conditions of the digital camera 20 with a touch of the LCD panel 22 by use of fingers or by use of a pen. The LCD panel 22 is constructed to rotate approximately 140-degrees from a position in which the LCD panel 22 may be engaged with the concave portion 30 (i.e., a closed position) to a position in which the LCD panel 22 stands (i.e., an opened position).

Further, the digital camera 20 includes LCD 31 and a variety of buttons and/or switches on an upper surface of the camera body 21. At a rear surface of the camera body 21, the digital camera 20 includes an eyepiece viewfinder 32 and a variety of buttons and/or switches.

As illustrated in FIGS. 2A and 2B, the digital camera 20 includes a compact flash (CF) card cover 35, a personal computer memory card (PC) cover 36, a card eject switch 37, and an AC adapter 38 at a left side surface of the camera body 21 in FIG. 2A. The digital camera 20 further includes an Audio Video (AV) output 40 at a right side surface of the camera body 21 in FIG. 3E.

Referring to FIGS. 1B and 3B, the waterproof case 1 for containing the digital camera 20 includes an optical system 50 serving as a conversion lens at a front part of the case body 2 where the photographic lens 25 of the digital camera 20 contained in the case body 2 faces. Hereinafter, the optical system 50 for the photographic lens 25 will be referred to as a conversion lens 50 for the photographic lens 25.

The conversion lens 50 for the photographic lens 25 optionally employs a wide conversion lens and a telephoto conversion lens. With the conversion lens 50 located in front of the photographic lens 25, functions of, for example, wide-angle shooting, telephoto shooting, and the like may be added to the digital camera 20.

Figure 4A:
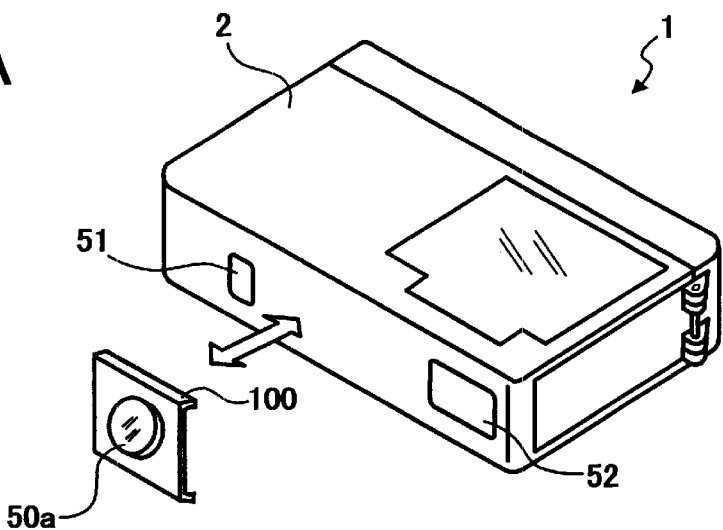
FIG. 4A is a schematic view of a conversion lens for a photographic lens detachably attachable to the waterproof case.

As one non-limiting alternative, the conversion lens 50 for the photographic lens 25 may be detachably arranged to the case body 2 of the waterproof case 1. For example, as illustrated in FIG. 4A, a conversion lens 50a for the photographic lens 25 is provided to an attachment part 100. The attachment part 100 is detachably attached to a part of the case body 2 where the photographic lens 25 of the digital camera 20 contained in the case body faces. In this construction, a wide conversion lens and a telephoto conversion lens may be optionally selected for the conversion lens 50a, thereby enhancing the functions of the digital camera 20.

Further, as illustrated in FIGS. 1B and 3B, the waterproof case 1 includes an optical system 51 serving as a conversion lens at a front part of the case body 2 where the viewfinder objective lens 26 of the digital camera 20 contained in the case body 2 faces. Hereinafter, the optical system 51 for the viewfinder objective lens 26 will be referred to as a conversion lens 51 for the viewfinder objective lens 26. The conversion lens 51 for the viewfinder objective lens 26 optionally may employ wide conversion lens and a telephoto conversion lens.

With the conversion lens 51 in front of the viewfinder objective lens 26, the conversion condition of the viewfinder objective lens 26 may be set to the same conversion condition of the photographic lens 25. As a result, an image may be photographed at the same field angle as a photographing range when an operator looks at an object image through the eyepiece viewfinder 32.

Figure 4B:
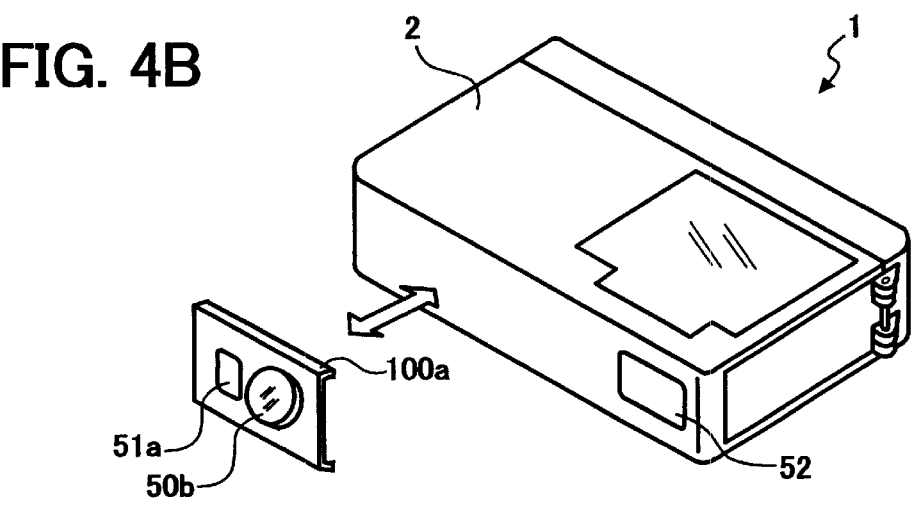
FIG. 4B is a schematic view of a conversion lens for a photographic lens and a conversion lens for a viewfinder objective lens integrally constructed and detachably attachable to the waterproof case.

As one non-limiting alternative, the conversion lens 50 for the photographic lens 25 and the conversion lens 51 for the viewfinder objective lens 26 may be integrally constructed and detachably attached to the case body 2. For example, as illustrated in FIG. 4B, a conversion lens 50b for the photographic lens 25 and a conversion lens 51a for the viewfinder objective lens 26 are provided to an attachment part 100a. The attachment part 100a is detachably attached to a part of the case body 2 where the photographic lens 25 and the viewfinder objective lens 26 of the digital camera 20 contained in the case body 2 face. With the above-described integral construction of the conversion lens 50b for the photographic lens 25 and the conversion lens 51a for the viewfinder objective lens 26, failures such as, but not limited to, mistake of combination and positional relation error between lenses may be avoided.

Moreover, as illustrated in FIGS. 1B and 3B, the waterproof case 1 includes a Fresnel lens 52 having a light distribution property adjusted to a photographing range formed by the conversion lens 50 and the photographic lens 25, and the conversion lens 51 and the viewfinder objective lens 26. The Fresnel lens 52 is arranged at a part of the case body 2 corresponding to the flash light emission window 27 of the digital camera 20 contained in the case body 2. The Fresnel lens 52 having a light distribution property adjusted to the photographing range formed by the conversion lens 50 and the photographic lens 25, and the conversion lens 51 and the viewfinder objective lens 26, the photographing may be performed with proper exposure when a flash is used.

Figure 4C:
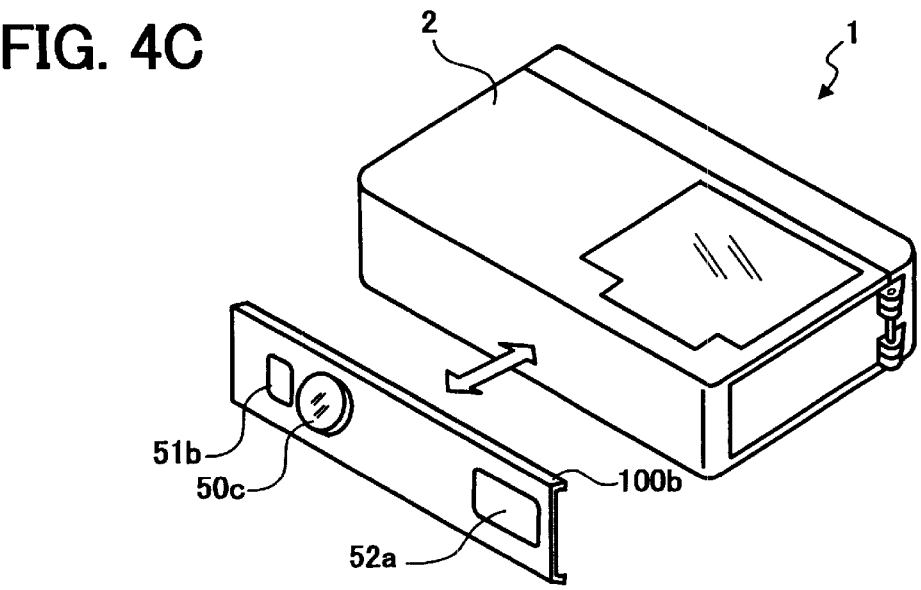
FIG. 4C is a schematic view of a conversion lens for a photographic lens, a conversion lens for a viewfinder objective lens, and a Fresnel lens integrally constructed and detachably attachable to the waterproof case.

As another non-limiting alternative, the conversion lens 50 for the photographic lens 25, the conversion lens 51 for the viewfinder objective lens 26, and the Fresnel lens 52 may be integrally constructed and detachably attached to the case body 2. For example, as illustrated in FIG. 4C, a conversion lens 50c for the photographic lens 25, a conversion lens 51b for the viewfinder objective lens 26, and a Fresnel lens 52a are provided to an attachment part 100b. The attachment part 100b is detachably attached to a part of the case body 2 where the photographic lens 25, the viewfinder objective lens 26, and the flash light emission window 27 of the digital camera 20 contained in the case body 2 face. With the above-described integral construction of the conversion lens 50c for the photographic lens 25, the conversion lens 51b for the viewfinder objective lens 26, and the Fresnel lens 52a, failures such as, but not limited to, mistake of combination and positional relation error between lenses may be avoided.

Figure 5:
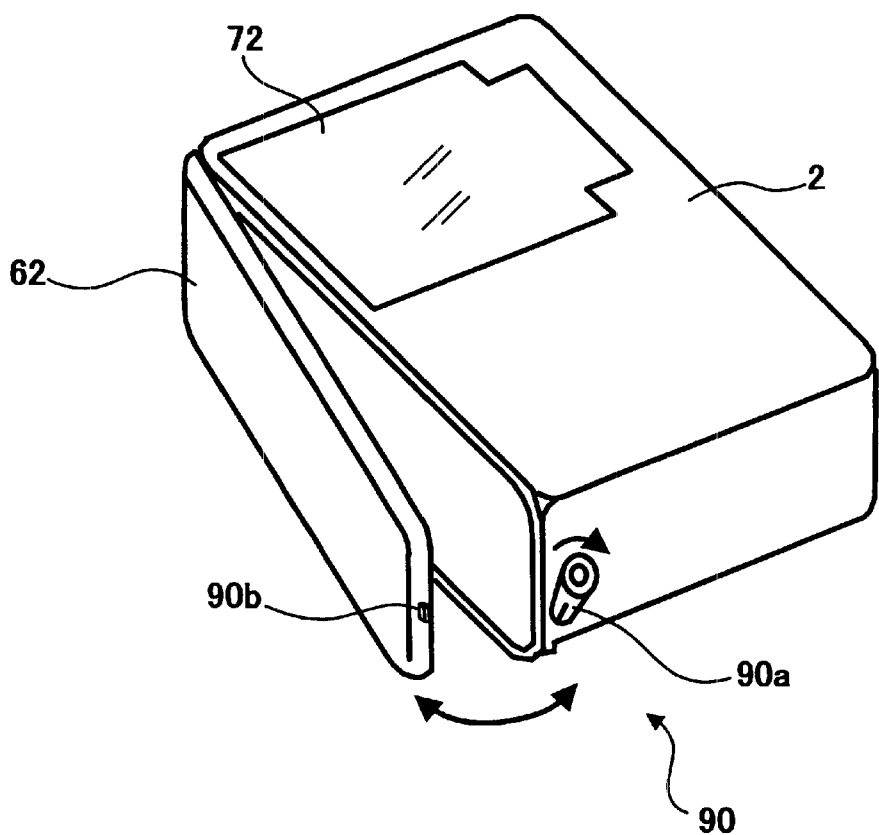
FIG. 5 is a schematic view of a locking device of the waterproof case.

Referring to FIG. 1A, the case body 2 of the waterproof case 1 includes a rotation support shaft 60 at a left side surface of the case body 2 in FIG. 1A, and a rear opening 61 formed at a rear part of the case body 2 for inserting the digital camera 20 into the case body 2. The case body 2 further includes a rear cover 62 pivotally supported by the rotation support shaft 60 so as to open and close the rear opening 61. After inserting the digital camera 20 into the case body 2 through the rear opening 61, the rear cover 62 is closed and may be locked by a locking device 90. As illustrated in FIG. 5, an exemplary locking device 90 includes a lock lever 90a and a convex portion 90b. The rear cover 62 is closed tightly by engaging the lock lever 90a with the convex portion 90b, so that the waterproof case 1 is watertight.

According to the embodiment of the present invention, with the above-described construction of the case body 2 of the waterproof case 1 into which the digital camera 20 is inserted through the rear opening 61, and in which the rear cover 62 is closed and locked by the locking device 90 after inserting the digital camera 20 into the case body 2, the waterproof case 1 may be assembled with a smaller number of parts and may thereby achieve an advantage in strength. In addition, the waterproof case 1 divided into fewer segments, which enhances the watertightness in the waterproof case 1. Further, because the rear opening 61 is opened and closed by the rear cover 62 which is pivotally supported by the rotation support shaft 60, operation buttons of the digital camera 20 arranged at the rear side of the digital camera 20 may be easily operated while the operation buttons are exposed to outside by opening the rear cover 62.

The case body 2 further includes a side opening 65 at a left side surface of the case body 2 in FIG. 1A. The case body 2 further includes a side cover 66 pivotally supported by the rotation support shaft 60 so as to open and close the side opening 65. The above-described rear cover 62 and the side cover 66 may be pivotally supported by the common rotation support shaft 60.

According to the embodiment of the present invention, with provision of the side opening 65 and the side cover 66 at the side surface of the waterproof case 1, a variety of cards such as a personal computer memory card (not shown), a compact flash card (not shown), and the like, as well as connectors for the digital camera 20 may be smoothly inserted and removed from their respective storing portions provided at the side surface of the digital camera 20 contained in the case body 2. Further, as described above, because the rotation support shaft 60 of the rear cover 62 and the side cover 66 is common, the waterproof case 1 may be constructed at a low cost while saving space. In addition, it is advantageous to the waterproof case 1 in its design.

Referring again to FIG. 1A, the waterproof case 1 further includes a sheet-like transparent member 71 arranged at a part of the case body 2 corresponding to the LCD panel 22 of the digital camera 20 contained in the case body 2, and a transparent upper cover 72 pivotally supported by a pivot part 72a so as to cover and uncover the sheet-like transparent member 71.

The sheet-like transparent member 71 is arranged such that inputting operational conditions of the digital camera 20 to the LCD panel 22 is performed from outside of the case body 2 by touching the surface of the LCD panel 22 with a pen 81 (illustrated in FIG. 6D) through the sheet-like transparent member 71.

Figure 6A:
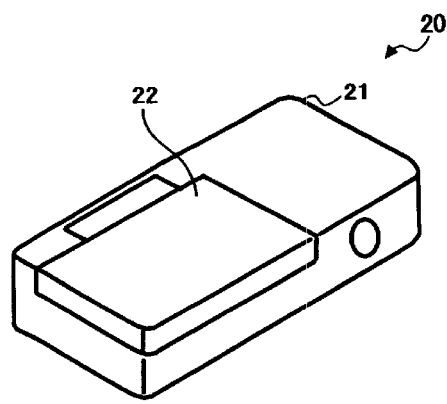
FIGS. 6A through 6D are schematic views of assistance in explaining biaxially rotating operations of an LCD panel of the digital camera.
Figure 6B:
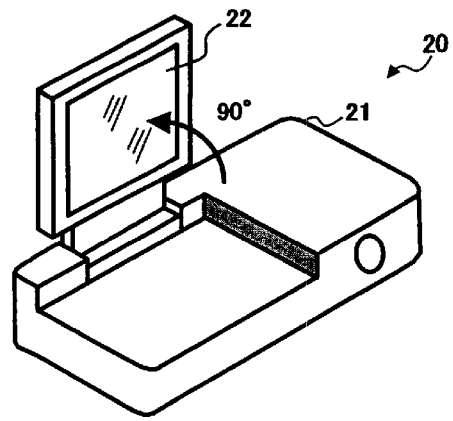
Figure 6C:
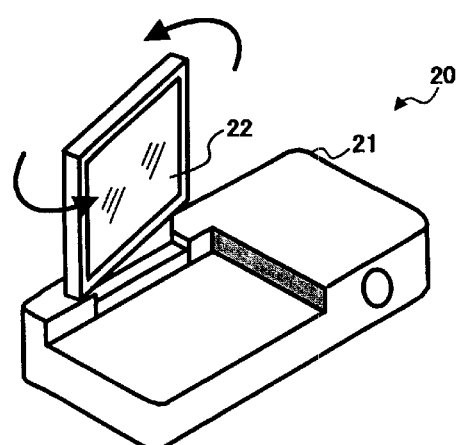
Figure 6D:
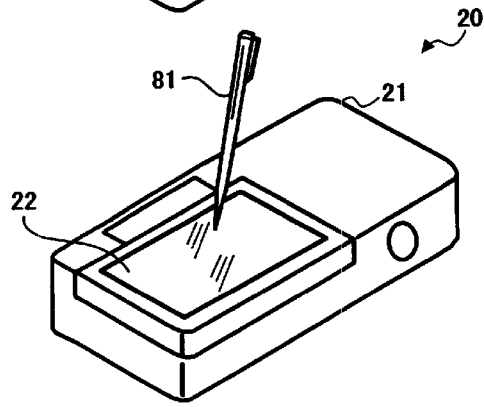

When containing the digital camera 20 in the case body 2, the LCD panel 22 may be set such that the LCD panel 22 faces upward (i.e., the LCD panel 22 opposes the sheet-like transparent member 71). Referring to FIGS. 6A through 6D, before inserting the digital camera 20 into the case body 2, the LCD panel 22 is rotated approximately 90-degrees from a closed position (illustrated in FIG. 6A) to an open position (illustrated in FIG. 6B). Next, referring to FIG. 6C, the LCD panel 22 is turned around by 180-degrees. Subsequently, the LCD panel 22 is rotated from the open position to the closed position (i.e., the LCD panel 22 is folded back approximately 90-degrees). As a result, as illustrated in FIG. 6D, the surface of the LCD panel 22 faces upward.

As described above, in waterproof case 1, including the sheet-like transparent member 71 arranged at a part of the case body 2 corresponding to the LCD panel 22 of the digital camera 20 contained in the case body 2, inputting operational conditions of the digital camera 20 to the LCD panel 22 may be performed from outside the case body 2 through the sheet-like transparent member 71 while maintaining the watertightness in the waterproof case 1.

Figure 7:
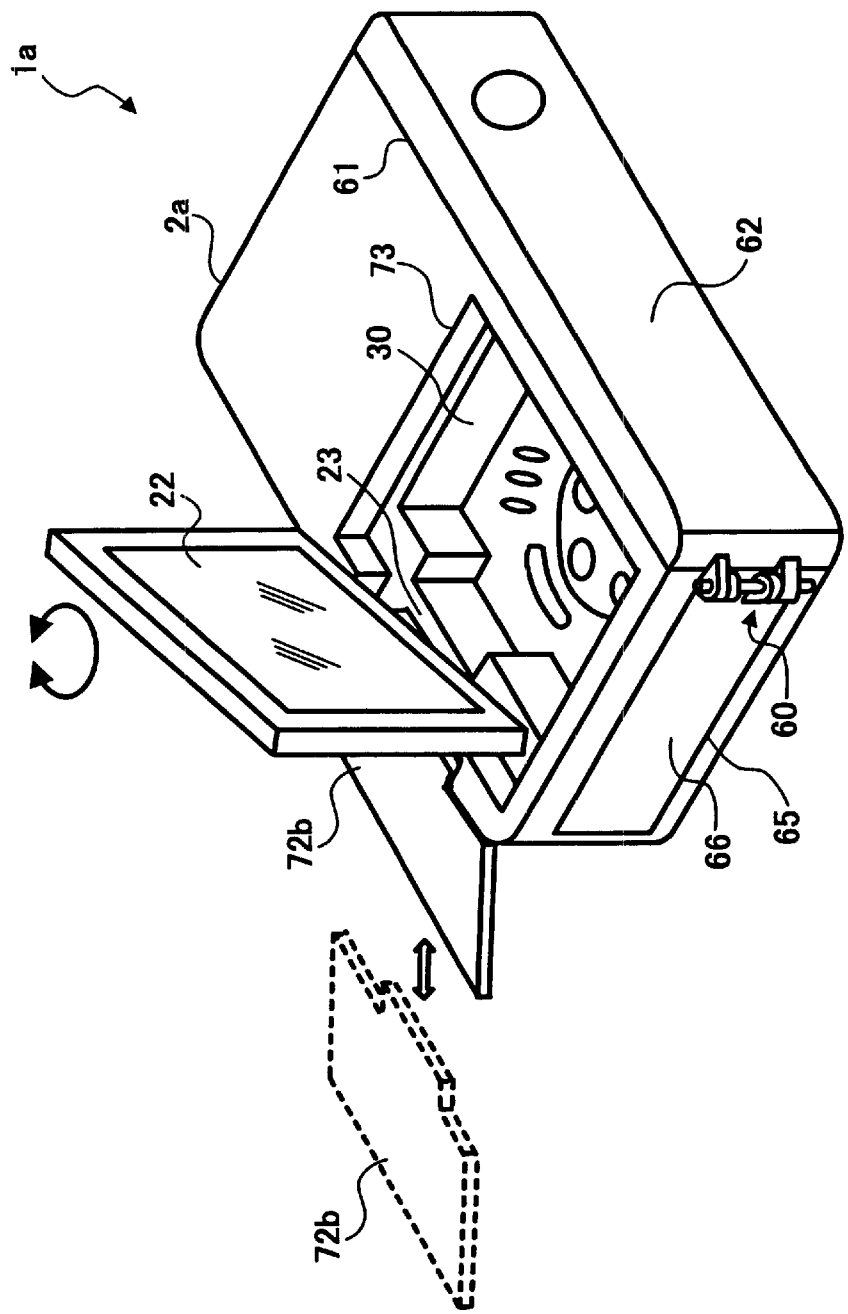
FIG. 7 is a schematic perspective view of a waterproof case for a digital camera according to another embodiment of the present invention.

Next, a waterproof case 1a according to another embodiment of the present invention will be described referring to FIG. 7. FIG. 7 is a schematic perspective view of a waterproof case for a digital camera according to another embodiment of the present invention.

The waterproof case 1a of FIG. 7 has a construction similar to the waterproof case 1 of FIGS. 1A and 1B with the exception of the sheet-like transparent member 71 and the upper cover 72 of the waterproof case 1. In the waterproof case 1a of FIG. 7, elements of the waterproof case 1a having substantially the same functions as those employed in the waterproof case 1 of FIGS. 1A and 1B are designated with the same reference numerals and their descriptions are omitted here.

As illustrated in FIG. 7, a case body 2a of the waterproof case 1a includes an opening 73 at a part corresponding to the LCD panel 22 of the digital camera 20 contained in the case body 2a. The waterproof case 1a of FIG. 7 includes an upper cover 72b pivotally supported by a pivot part (not shown) so as to open and close the opening 73 of the case body 2a. The upper cover 72b is made of a transparent resin material such as plastic such that inputting operational conditions of the digital camera 20 to the LCD panel 22 may be performed from outside the waterproof case 1a through the upper cover 72b.

According to another embodiment of the present invention, when the digital camera 20 is used under the condition in which the digital camera 20 is required to be protected from water, or the like, operational conditions of the digital camera 20 may be input to the LCD panel 22 through the closed upper cover 72b. When the digital camera 20 is used at a place free from water, the LCD panel 22 may be input directly with the upper cover 72b opened.

As described earlier, the LCD panel 22 is pivotally supported by the biaxial pivotal part 23 and is biaxially rotatable. In the waterproof case 1a of FIG. 7 when the digital camera 20 is contained in the case body 2a, because the upper cover 72b is constructed to be rotatable (i.e., openable), the LCD panel 22 may be biaxially rotated after opening the upper cover 72b.

Figure 8A:
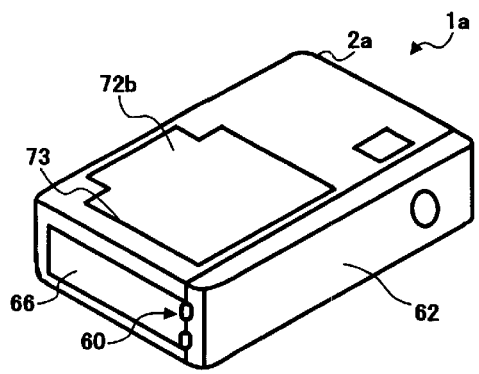
FIGS. 8A through 8D are schematic views of assistance in explaining biaxially rotating operations of the LCD panel of the digital camera contained in a case body of the waterproof case of FIG. 7.
Figure 8B:
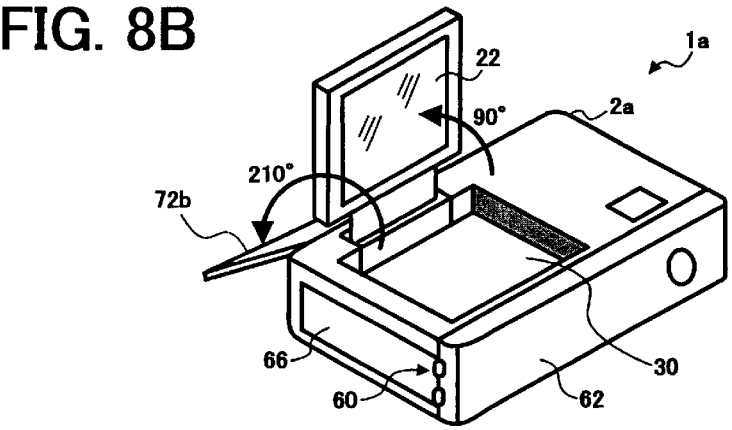
Figure 8C:
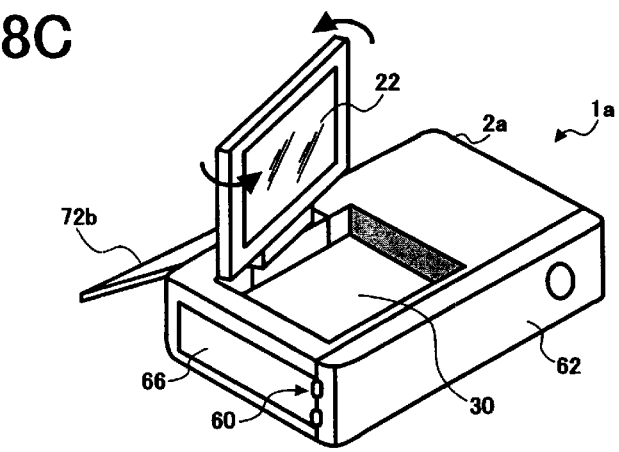
Figure 8D:
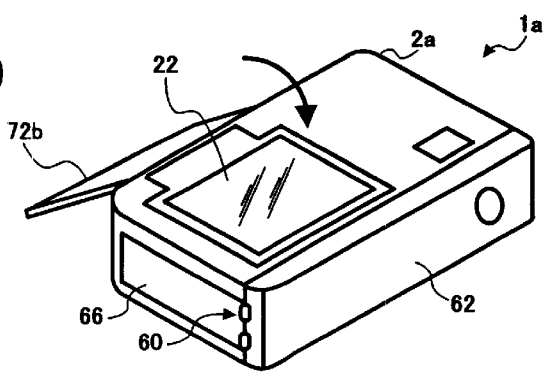

FIGS. 8A through 8D are schematic views illustrating exemplary biaxially rotating operations of the LCD panel 22 of the digital camera 20 contained in the case body 2a of the waterproof case 1a of FIG. 7. As explained earlier referring to FIGS. 6A through 6D, first the LCD panel 22 is rotated approximately 90-degrees from a closed position to an open position as illustrated in FIG. 8B. Next, referring to FIG. 8C, the LCD panel 22 is turned around by 180-degrees. Subsequently, the LCD panel 22 is rotated from the open position to the closed position (i.e., the LCD panel 22 is folded back by approximately 90-degrees). As a result, as illustrated in FIG. 8D, the surface of the LCD panel 22 faces upward.

In the waterproof case 1a, the upper cover 72b is constructed to rotate to a position where the upper cover 72b does not interfere with a rotation orbit of the LCD panel 22. For example, the upper cover 72b is rotatable to a position at an approximately 210-degree angle relative to a surface of the part of the case body 2a having the opening 73. Thereby, the LCD panel 22 may be biaxially rotated. As an alternative construction of the upper cover 72b that does not interfere with a rotation orbit of the LCD panel 22, the upper cover 72b may be detachable from the case body 2a.

In the waterproof case 1 of FIG. 1A and the waterproof case 1a of FIG. 7, the upper covers 72 and 72b or the sheet-like transparent member 71 include an optical system 75 having, for example, a convex lens that magnifies at least a part of the display of the LCD panel 22 (the optical system 75 is illustrated in FIG. 3A as a representative). With provision of the optical system 75 to the upper covers 72 and 72b or the sheet-like transparent member 71, the viewability of the display of the LCD panel 22 may be increased even when the digital camera 20 is used under bad conditions (e.g., in the water).

Further, in the waterproof case 1 of FIG. 1A and the waterproof case 1a of FIG. 7, a holding portion 80 that holds the pen 81 for inputting operational conditions of the digital camera 20 to the LCD panel 22 is provided at each appropriate place of the case body 2 and the case body 2a. In the embodiments, for example, the holding portion 80 is formed at a position along an upper end edge of the rear cover 62 (the holding portion 80 is illustrated in FIG. 3C as a representative). The one end of the holding portion 80 opens toward a right side surface of the rear cover 62 in FIG. 3C. The holding portion 80 may be shaped like a hollow, a groove, or the like.

By constructing the holding portion 80 such that the holding portion 80 does not communicate with the inside of the case body 2 or the case body 2a, it may prevent water from getting into the inside of the case body 2 or the case body 2a through an opening of the holding portion 80. Further, the inside of the holding portion 80 may shut out water by providing a packing at the opening of the holding portion 80. Alternatively, the holding portion 80 may be constructed such that the pen 81 is removed from the holding portion 80 only when the rear cover 62 is opened.

With the holding portion 80 for holding the pen 81 at an appropriate place in the case body 2 and at an appropriate place the case body 2a, an operator may conveniently keep the pen 81, and the possibility that the operator loses the pen is reduced.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A waterproof case system for containing a camera, comprising:

a case body configured such that the camera is freely inserted therein and removed therefrom;

wherein the case body further comprises a sheet-like transparent member having a transparent upper cover; and a first optical system arranged at a first part of the case body where a photographic lens of the camera faces, said first optical system including a conversion lens configured to cooperate with the photographic lens.

2. The system according to claim 1, wherein the optical system is detachably attached to the case body.

3. The system according to claim 1, further comprising a second optical system arranged at a second part of the case body where a viewfinder objective lens of the camera faces, said second optical system including a conversion lens configured to cooperate with the viewfinder objective lens.

4. The system according to claim 3, wherein the first optical system configured to cooperate with the photographic lens and the second optical system configured to cooperate with the viewfinder objective lens are integrally constructed and detachably attached to the case body.

5. The system according to claim 3, further comprising a Fresnel lens having a light distribution property adjusted to a photographing range formed by the first optical system configured to cooperate with the photographic lens and the second optical system configured to cooperate with the viewfinder objective lens, wherein the Fresnel lens is arranged at a third part of the case body corresponding to a flash light emission window of the camera contained in the case body.

6. The system according to claim 1, further comprising a Fresnel lens having a light distribution property adjusted to a photographing range formed by the first optical system configured to cooperate with the photographic lens, wherein the Fresnel lens is arranged at a third part of the case body corresponding to a flash light emission window of the camera contained in the case body.

7. The system according to claim 6, wherein the first optical system configured to cooperate with the photographic lens and the Fresnel lens are integrally constructed and detachably attached to the case body.

8. The system according to claim 5, wherein the first optical system configured to cooperate with the photographic lens, the second optical system configured to cooperate with the viewfinder objective lens, and the Fresnel lens are integrally constructed and detachably attached to the case body.

9. A waterproof case device for containing a flat binocular type camera, comprising:
- a case body configured such that the camera is freely inserted therein and removed therefrom, the case body having a rear opening at a rear part of the case body configured to insert the camera into the case body;
- a rear cover configured to be pivotally supported by a first shaft so as to open and close the rear opening of the case body; and
- a lock mechanism configured to lock the closed rear cover so that the waterproof case is watertight.

10. The device according to claim 9, wherein the case body further comprises a side opening at a side part of the case body, wherein
the waterproof case further comprises a side cover configured to be pivotally supported by a second shaft so as to open and close the side opening of the case body, and wherein the first shaft and the second shaft are unitarily formed.

11. A waterproof case device for containing a camera having a liquid crystal display (LCD) panel serving as an operation unit for inputting operational conditions of the camera, the waterproof case comprising:
- a case body configured such that the camera is freely inserted therein and removed therefrom; and
- a sheet-like transparent member arranged at a part of the case body corresponding to the LCD panel of the camera contained in the case body such that inputting operational conditions of the camera to the LCD panel is performable from outside of the case body through the sheet-like transparent member.

12. The waterproof case device according to claim 11, further comprising a rotatable upper cover configured to cover and uncover the sheet-like transparent member.

13. The waterproof case device according to claim 12, wherein the upper cover includes an optical system configured to magnify display of the LCD panel.

14. The waterproof case device according to claim 11, wherein the sheet-like transparent member includes an optical system configured to magnify a display of the LCD panel.

15. The waterproof case device according to claim 11, wherein the case body includes a holding portion that holds a pen configured to input operational conditions of the camera to the LCD panel.

16. A waterproof case for containing a camera having a liquid crystal display (LCD) panel serving as an operation unit for inputting operational conditions of the camera, the waterproof case, comprising:
- a case body configured such that the camera is freely inserted therein and removed therefrom, the case body forming an opening at a part corresponding to the LCD panel of the camera contained in the case body; and
- a rotatable upper cover configured to open and close the opening of the case body.

17. The waterproof case device according to claim 16, wherein the upper cover is detachable from the case body.

18. The waterproof case device according to claim 16, wherein the upper cover is made of a transparent material such that inputting operational conditions of the camera to the LCD panel is performable from outside of the waterproof case through the upper cover.

19. The waterproof case device according to claim 16, wherein the upper cover includes an optical system configured to magnify a display of the LCD panel.

20. The waterproof case device according to claim 16, wherein the upper cover is rotatable to a position where the upper cover does not interfere with a rotation orbit of the LCD panel of the camera contained in the case body.

21. The waterproof case device according to claim 16, wherein the upper cover is rotatable to a position at an approximately 210-degree angle relative to a surface of the part having the opening.

22. The waterproof case device according to claim 16, wherein the case body includes a holding portion that holds a pen configured to input operational conditions of the camera to the LCD panel.

23. A waterproof case device for containing a camera, comprising:
- means for containing the camera being configured such that the camera is freely inserted therein and removed therefrom;
- wherein the means for containing the camera further comprises sheet-like transparent means having transparent upper cover means; and
- means for optical conversion arranged at a part of the means for containing where a photographic lens of the camera faces, said means for optical conversion is configured to cooperate with the photographic lens.

24. A waterproof case device for containing a flat binocular type camera, comprising:
- means for containing the camera, the means for containing being configured such that the camera is freely inserted therein and removed therefrom, and having means for inserting the camera into the means for containing, said means for inserting formed at a rear part of the means for containing;
- means for opening and closing the means for inserting of the means for containing, the means for opening and closing configured to be pivotally supported by a shaft; and
- means for locking the means for opening and closing in a closed position so that the waterproof case is watertight.

25. A waterproof case device for containing a camera having a liquid crystal display (LCD) panel serving as an operation unit for inputting operational conditions of the camera, the waterproof case device comprising:
- means for containing the camera, the means for containing being configured such that the camera is freely inserted therein and removed therefrom; and
- a sheet-like transparent member arranged at a part of the means for containing corresponding to the LCD panel of the camera contained in the means for containing such that inputting operational conditions of the camera to the LCD panel is performable outside of the means for containing through the sheet-like transparent member.

26. The waterproof case device according to claim 25, further comprising means for covering and uncovering the sheet-like transparent member.

27. The waterproof case device according to claim 25, wherein the means for containing includes means for holding a pen configured to input operational conditions of the camera to the LCD panel.

28. The waterproof case device according to claim 26, wherein the means for covering and uncovering includes means for magnifying a display of the LCD panel.

29. The waterproof case device according to claim 25, wherein the sheet-like transparent member includes means for magnifying a display of the LCD panel.

30. A waterproof case device for containing a camera having a liquid crystal display (LCD) panel serving as an operation unit for inputting operational conditions of the camera, the waterproof case, comprising:

means for containing the camera being configured such that the camera is freely inserted therein and removed therefrom, a part of the means for containing forming an opening formed within a part of the means for containing corresponding to the LCD panel of the camera contained in the means for containing; and means for opening and closing the opening of the means for containing.

31. The waterproof case device according to claim 30, wherein the means for opening and closing includes means for magnifying a display of the LCD panel.

32. The waterproof case device according to claim 30, wherein the means for containing includes means for holding a pen configured to input operational conditions of the camera to the LCD panel.

\* \* \* \* \*